United States Patent
Cho et al.

(10) Patent No.: US 10,205,911 B2
(45) Date of Patent: Feb. 12, 2019

(54) METHOD AND SYSTEM FOR DETECTING RUNNING

(71) Applicant: S-1 CORPORATION, Seoul (KR)

(72) Inventors: Minkook Cho, Seoul (KR); Dong Sung Lee, Seongnam-si (KR)

(73) Assignee: S-1 CORPORATION, Seoul (KR)

( * ) Notice: Subject to any disclaimer, the term of this patent is extended or adjusted under 35 U.S.C. 154(b) by 0 days.

(21) Appl. No.: 15/507,760

(22) PCT Filed: Oct. 23, 2014

(86) PCT No.: PCT/KR2014/010015
§ 371 (c)(1),
(2) Date: Feb. 28, 2017

(87) PCT Pub. No.: WO2016/035924
PCT Pub. Date: Mar. 10, 2016

(65) Prior Publication Data
US 2017/0287145 A1 Oct. 5, 2017

(30) Foreign Application Priority Data
Sep. 4, 2014 (KR) .................. 10-2014-0117977

(51) Int. Cl.
*G06K 9/48* (2006.01)
*H04N 7/18* (2006.01)
(Continued)

(52) U.S. Cl.
CPC .............. *H04N 7/18* (2013.01); *G06T 7/20* (2013.01); *G08B 13/19613* (2013.01);
(Continued)

(58) Field of Classification Search
CPC .............. H04N 7/18; G08B 13/19613; G08B 13/19645; G06T 7/80; G06T 7/001
(Continued)

(56) References Cited

U.S. PATENT DOCUMENTS

| | | | | |
|---|---|---|---|---|
| 6,377,514 B1 * | 4/2002 | Linnenbrink | .......... | G01H 3/125 367/11 |
| 7,751,589 B2 * | 7/2010 | Bovyrin | .................. | G06K 9/00 382/100 |
| 8,582,867 B2 * | 11/2013 | Litvak | ................ | G06K 9/00201 382/154 |
| 8,681,223 B2 * | 3/2014 | Howe | ................ | G06K 9/00771 345/156 |

(Continued)

FOREIGN PATENT DOCUMENTS

| JP | 2002-190027 A | 7/2002 |
|---|---|---|
| JP | 2009-301494 A | 12/2009 |

(Continued)

OTHER PUBLICATIONS

International Search Report of PCT Application No. PCT/KR2014/010015, dated Apr. 29, 2015.

*Primary Examiner* — Sheela C Chawan
(74) *Attorney, Agent, or Firm* — Pearl Cohen Zedek Latzer Baratz LLP

(57) ABSTRACT

Disclosed are a method and a system for detecting running. The system for detecting running detects a moving object in an input image and detects a foreground edge of the object. Further, the system for detecting running uses the foreground edge to extract a foot-print image coordinate and extract a head coordinate of the object and uses the foot-print image coordinate, a titled angle of the camera, and an installation height of the camera to acquire a foot-print real coordinate. Here, the system for detecting running uses the foot-print real coordinate of the object and the height of the object to determine whether the object runs.

8 Claims, 9 Drawing Sheets

(51) Int. Cl.
  *G06T 7/20* (2017.01)
  *G08B 13/196* (2006.01)
  *G06T 7/80* (2017.01)
  *G06T 7/00* (2017.01)

(52) U.S. Cl.
  CPC ........ *G08B 13/19645* (2013.01); *G06T 7/001* (2013.01); *G06T 7/80* (2017.01); *H04N 7/183* (2013.01)

(58) Field of Classification Search
  USPC ....... 382/151, 154, 181, 190, 195, 199, 100, 382/141, 145, 276, 278, 286, 291, 289; 348/61, 86, 94, 143, 135; 702/127, 150, 702/152, 153
  See application file for complete search history.

(56) References Cited

U.S. PATENT DOCUMENTS

| | | | |
|---|---|---|---|
| 8,873,813 B2* | 10/2014 | Tadayon | G06K 9/00 382/118 |
| 9,916,538 B2* | 3/2018 | Zadeh | G06K 9/627 |
| 2012/0327241 A1 | 12/2012 | Howe | |
| 2014/0152810 A1 | 6/2014 | Bae | |

FOREIGN PATENT DOCUMENTS

| | | |
|---|---|---|
| KR | 10-2007-0115000 A | 12/2007 |
| KR | 10-2009-0015456 A | 2/2009 |
| KR | 10-2010-0019773 A | 2/2010 |
| KR | 10-1051390 B1 | 7/2011 |
| KR | 10-2013-0062489 A | 6/2013 |
| KR | 10-2013-0094489 A | 8/2013 |
| KR | 10-1398684 B1 | 5/2014 |
| KR | 10-2014-0071188 A | 6/2014 |

* cited by examiner

METHOD AND SYSTEM FOR DETECTING RUNNING

CROSS-REFERENCE TO RELATED APPLICATIONS

This application is a National Phase Application of PCT International Application No. PCT/KR204/010015, International Filing Date Oct. 23, 2014, claiming priority of Korean Patent Application No. 10-2014-0117977, filed Sep. 4, 2014, which is hereby incorporated by reference in its entirety.

Field of the Invention

The present invention relates to a method and a system for detecting running.

Background of the Invention

To meet demands of the times where there has been a growing interest in social safety and environmental safety is considered as important, social demands for a method and a system for detecting running conditions have been increased.

The existing running detection method detects running by converting a real-world three-dimensional coordinate into a two-dimensional coordinate of an image using a camera calibration and calculating a moving distance of an object using the converted image.

Here, a camera calibration method for converting a real-world three-dimensional coordinate (hereinafter, referred to as 'world coordinate') into a two-dimensional coordinate of an image is important. For this purpose, a method for using a plane pattern having a lattice shape has been generally used. The camera calibration performance relies on a calculation of a conversion matrix that converts a world coordinate into an image coordinate, in which the conversion matrix is referred to as a homography matrix. The camera calibration method is represented by the following Equation 1.

$$s\begin{bmatrix}x\\y\\1\end{bmatrix}=\begin{bmatrix}f_x & skew\_cf_x & c_x\\0 & f_y & c_y\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix}=A[R|t]\begin{bmatrix}X\\Y\\Z\\1\end{bmatrix}$$ (Equation 1)

In the above Equation 1, A represents a matrix for correcting an internal distortion of the camera, [R|t] represents a rotation/movement conversion matrix for converting a world coordinate into an image coordinate, and X, Y, and Z represent the world coordinate, and x and y represent the image coordinate. In the above Equation 1, A[R|t] is called the homography matrix and $f_x$, $f_y$, $c_x$, $c_y$, and skew_c each represent a focal length, a main point, and an asymmetric coefficient for x and y of the image. The main point is generated by an aspect ratio of an image sensor (CMOS, CCD, etc.) and the asymmetric coefficient is generated by an error caused during the manufacturing of the camera. The influence of the parameters is large in the initial stage of the manufacturing of the camera. At the present, however, there is little influence of the parameters due to the technical development.

Therefore, the rest parameters (focus, rotation/movement conversion matrix, world coordinate) need to be calculated to obtain the homography matrix. In this case, the world coordinate and the image coordinate match each other by the plane pattern having the lattice shape. FIG. 1 is a diagram illustrating the plane pattern having the lattice shape used to obtain the homography matrix.

To calculate the rest parameters, basic specifications (focal length, vertical/horizontal angle of view, etc.) of the camera, installation height and angle information of the camera, etc., are required. Further, if the camera is installed, there is a need to acquire the information on the world coordinate using the plane pattern having the lattice shape of FIG. 1. However, industrial sites such as factories handling dangerous objects and business places are usually large in scale, and therefore hundreds of cameras need to be installed. As a result, it is difficult to apply the existing camera calibration method.

SUMMARY OF THE INVENTION

The present invention has been made in an effort to provide a method and a system for detecting running having advantages of using user input information without using a plane pattern.

An exemplary embodiment of the present invention provides a system for detecting running. The system for detecting running includes: an object detector detecting a moving object in an image photographed by a camera; a foreground edge detector detecting a foreground edge of the object; a foot-print and head coordinate extractor using the foreground edge to extract a foot-print image coordinate and extract a head coordinate that is a coordinate for a head part of the object; a camera installation angle calculator calculating a tilt angle of the installed camera; a coordinate converter using the foot-print image coordinate, the angle, and an installation height of the camera to acquire a foot-print real coordinate that is a coordinate where the object is spaced apart from the camera; a height extractor calculating a height of the object; and a running condition determinator using the foot-print real coordinate and the height of the object to determine whether the object runs.

The installation height of the camera may be a value arbitrarily set by a user.

The height extractor may use the installation height of the camera, the foot-print image coordinate, and the head coordinate to calculate the height of the object.

The camera installation angle calculator may use a vertical angle of view of the camera, the number of vertical pixels of the image, and the number of Y-axis coordinate pixels spaced apart from a center of the camera to calculate the angle.

The coordinate converter may acquire the foot-print real coordinate based on a back perspective conversion method.

The coordinate converter may calculate a first distance of the foot-print spaced apart from the camera in a vertical direction and use the first distance to calculate a second distance that is a distance of the foot-print spaced apart from the camera in a horizontal direction and the first distance and the second distance may be the foot-print real coordinate.

The foot-print real coordinate and the height of the object may be changed depending on the installation height of the camera.

The running condition determinator may use the foot-print real coordinate to calculate the moving distance of the object and determine that the object runs when the moving distance is larger than the height of the object.

The object detector may detect the object by a background modeling method.

The foreground edge detector may detect an image edge from the entire image of the object, detect a time edge using a current image of the object and an image temporally continued to the current image of the object, and extract a common component of the image edge and the time edge as the foreground edge.

The camera may be a pinhole camera.

Another embodiment of the present invention provides a method for detecting running of an object using an image photographed by a camera in a system for detecting running. The method for detecting running of an object using an image photographed by a camera in a system for detecting running, includes: detecting a moving object in the image; detecting a foreground edge of the object; extracting a foot-print image coordinate using the foreground edge; extracting a head coordinate that is a coordinate for a head part of the object using the foreground edge; calculating a tilt angle of the installed camera; acquiring a foot-print real coordinate that is a coordinate where the object is spaced apart from the camera using the foot-print image coordinate, the angle, and an installation height of the camera; calculating a height of the object; and determining whether the object runs using the foot-print real coordinate and the height of the object.

The installation height of the camera may be a value arbitrarily set by a user.

The calculating of the height of the object may include calculating the height of the object using the installation height of the camera, the foot-print image coordinate, and the head coordinate.

The foot-print real coordinate and the height of the object may rely on the installation height of the camera.

The calculating of the angle may include calculating the angle using a vertical angle of view of the camera, the number of vertical pixels of the image, and the number of Y-axis coordinate pixels spaced apart from a center of the camera.

The acquiring of the foot-print real coordinate may include: calculating a first coordinate that is a coordinate where the foot-print is spaced apart from the camera in a vertical direction; and calculating a second coordinate that is a coordinate where the foot-print is spaced apart from the camera in a horizontal direction using the first coordinate.

The determining may include: calculating the moving distance of the object using the foot-print real coordinates; and comparing the moving distance with the height of the object.

The determining may further include determining that the object runs when the moving distance is larger than the height of the object.

According to an exemplary embodiment of the present invention, it is possible to automatically detect whether the object runs using only the input information of the user.

DETAILED DESCRIPTION OF THE INVENTION

Figure 1:
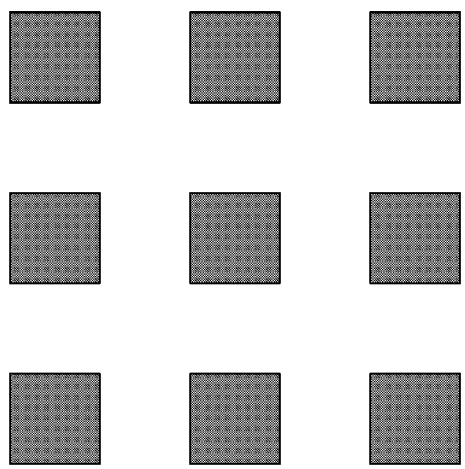
FIG. 1 is a diagram illustrating a plane pattern having a lattice shape used to obtain a homography matrix.

In the following detailed description, only certain exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and claims, unless explicitly described to the contrary, "comprising" and "including" any components will be understood to imply the inclusion of other elements rather than the exclusion of any other elements.

Hereinafter, a method and a system for detecting running according to an exemplary embodiment of the present invention will be described in detail with the accompanying drawings.

Figure 2:
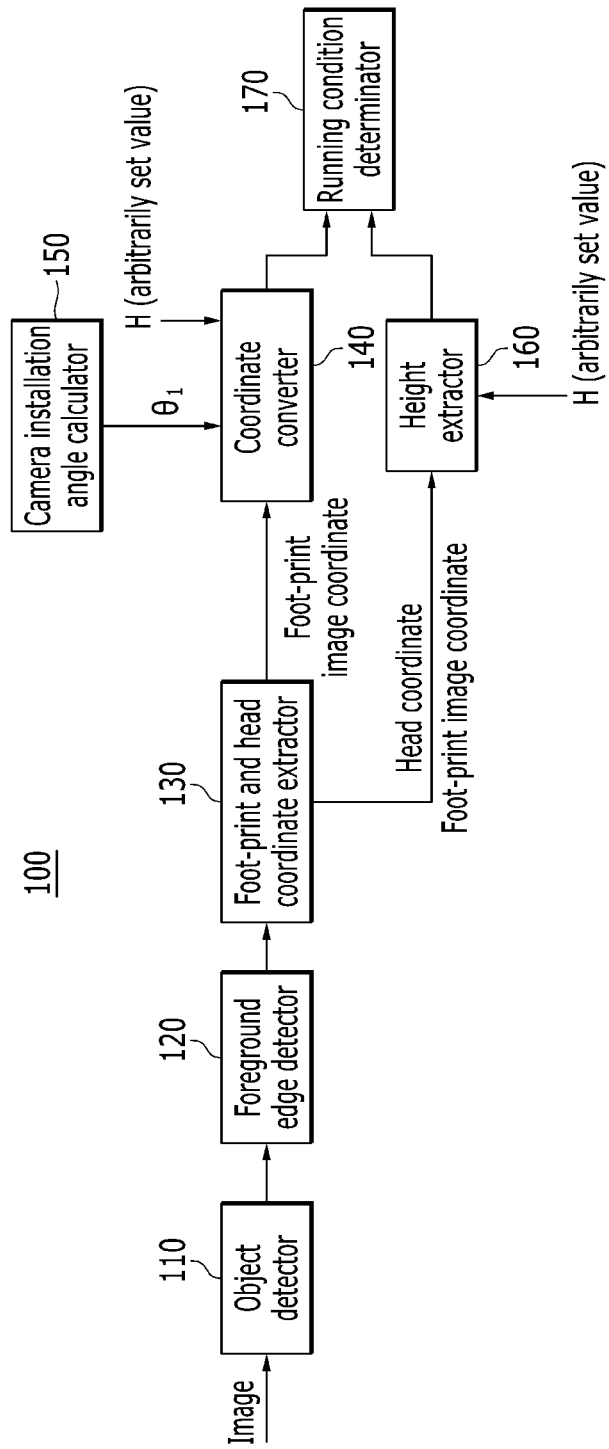
FIG. 2 is a diagram illustrating a system for detecting running according to an exemplary embodiment of the present invention.

FIG. 2 is a diagram illustrating a system for detecting running according to an exemplary embodiment of the present invention.

As illustrated in FIG. 2, a system 100 for detecting running according to an exemplary embodiment of the present invention includes an object detector 110, a foreground edge detector 120, a foot-print and head coordinate extractor 130, a coordinate converter 140, a camera installation angle calculator 150, a height extractor 160, and a running condition determinator 170.

The object detector 110 detects a moving object by applying a tracking algorithm to the image photographed by the camera. There are various tracking algorithms in the field of video surveillance. Among the tracking algorithms, a codebook-based background modeling method may detect an object. Here, if the object is detected by the object detector 110, a square zone of the object is created. The background modeling method detects an object by considering a pixel having a threshold value or more, which is defined by learning a dispersion of values of each pixel in an image, as a foreground. The background modeling method is known by a person having ordinary skill in the art to which the present invention pertains and therefore the detailed description thereof will be omitted.

The foreground edge detector 120 detects a foreground edge for the object detected by the object detector 110. The foreground edge detector 120 detects edges of several sheets of images on a time base of each pixel of the detected object. More specifically, the foreground edge detector 120 detects an edge (hereinafter, referred to as 'image edge') from the entire image of one object first input and an edge component (hereinafter, referred to as 'time edge') using a plurality of object images input over time. Further, the foreground edge detector 120 extracts the common component of the detected image edge and time edge and defines the edge satisfying the common component as the foreground edge. The method for obtaining the foreground edge is described in detail in Korean Patent No. 10-1398684 and therefore the detailed description thereof will be omitted. Meanwhile, the foreground edge detected by the foreground edge detector 120 is set to have a square zone smaller than that of the object detected by the object detector 110.

Meanwhile, the foot-print and head coordinate extractor 130 uses the square zone of the foreground edge to extract a foot-print image coordinate and extract a coordinate (hereinafter, referred to as 'head coordinate') corresponding to a head part of an object. The foot-print and head coordinate extractor 130 sets a pixel position of a lower portion of a y axis and a central point of an x axis in the square zone of the foreground edge detected by the foreground edge detector 120 as the foot-print image coordinate of the corresponding object. Further, the foot-print and head coordinate extractor 130 sets a pixel position of an upper portion of the y axis and the central point of the x axis in the square zone of the foreground edge detected by the foreground edge detector 120 as the head coordinate of the corresponding object. The foot-print coordinate extracted by the foot-print and head coordinate extractor 130 is input to the coordinate converter 140 and the height extractor 160 and the head coordinate is input to the height extractor 160.

The coordinate converter 140 uses the foot-print image coordinate of the object based on a back perspective conversion method to acquire a coordinate (hereinafter, referred to as 'foot-print real coordinate') where the corresponding object is spaced apart from the actual camera. The back perspective conversion method is based on a pinhole camera model as illustrated in the following FIG. 3.

Figure 3:
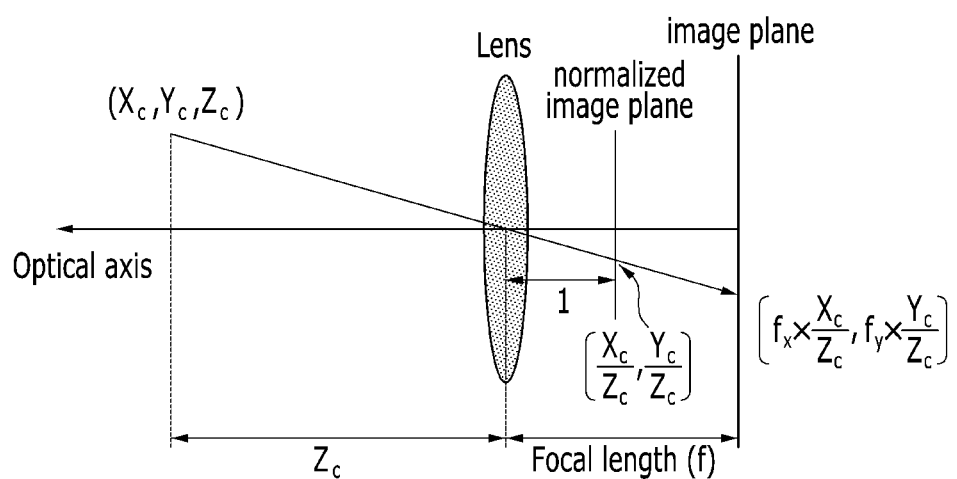
FIG. 3 is a diagram illustrating a pinhole camera model according to an exemplary embodiment of the present invention.
Figure 4:
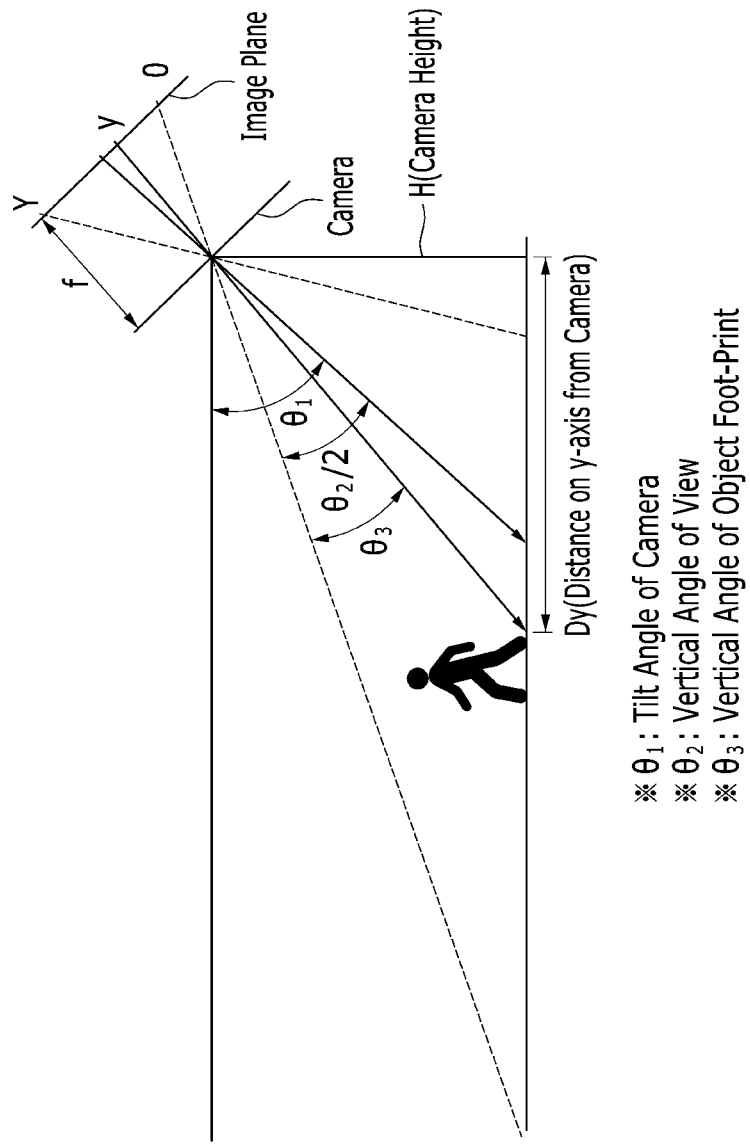
FIG. 4 is a diagram illustrating an installation state of the pinhole camera according to the exemplary embodiment of the present invention.

FIG. 3 is a diagram illustrating a pinhole camera model according to an exemplary embodiment of the present invention and FIG. 4 is a diagram illustrating an installation state of the pinhole camera according to the exemplary embodiment of the present invention.

According to an exemplary embodiment of the present invention, as illustrated in FIG. 4, it is assumed that the camera is installed at a predetermined height and the camera photographs an image while being tilted at any angle. The coordinate converter 140 first calculates a distance Dy of an object spaced apart from the camera in a vertical direction and then a distance Dx of the object spaced apart from the camera in a horizontal direction for the back perspective conversion. Here, the foot-print real coordinate is Dx and Dy.

Here, as described below, the height H of the camera is a value arbitrarily set by a user and the tilt angle $\Theta_1$ of the camera is automatically calculated by the camera installation angle calculator 150. Further, $\Theta_2$ is a vertical angle of view of the corresponding camera and is a value preset by the camera. Further, $\Theta_3$ is a vertical angle of object foot-print for the foot-print of the object and the coordinate converter 140 may calculate the $\Theta_3$ using the foot-print coordinate. Therefore, the relationship between the distance Dy of the object spaced apart from the camera in the vertical direction and the installation height H of the camera is as the following Equation 2.

$$\tan\left(\Theta_1 - \frac{\Theta_2}{2} + \Theta_3\right) = \frac{H}{Dy} \quad \text{(Equation 2)}$$

The left side of Equation 2 is solved and arranged as shown in Equation 3.

$$\tan\left(\Theta_1 - \frac{\Theta_2}{2} + \Theta_3\right) = \frac{\tan(\Theta_1) + \tan\left(\Theta_3 - \frac{\Theta_2}{2}\right)}{1 - \tan(\Theta_1) \times \tan\left(\Theta_3 - \frac{\Theta_2}{2}\right)} \quad \text{(Equation 3)}$$

Meanwhile, the relationship between the $\Theta_2$ and the focal length f is as the following Equation 4.

$$\tan\left(\frac{\Theta_2}{2}\right) = \frac{\frac{Y}{2}}{f} \quad \text{(Equation 4)}$$

The above Equations 3 and 4 are arranged as the following Equation 5.

$$-\tan\left(\Theta_3 - \frac{\Theta_2}{2}\right) = \quad \text{(Equation 5)}$$

$$-\frac{\tan(\Theta_3) - \tan\left(\frac{\Theta_2}{2}\right)}{1 + \tan(\Theta_3) \times \tan\left(\frac{\Theta_2}{2}\right)} = \frac{y - \frac{Y}{2}}{f} = \frac{2y - Y}{Y} \times \tan\left(\frac{\Theta_2}{2}\right)$$

The distance Dy of the object spaced apart from the camera in the vertical direction is finally calculated as the following Equation 6 using the above Equations 2 and 5.

$$Dy = \quad \text{(Equation 6)}$$

$$\frac{H}{\tan\left(\Theta_1 - \frac{\Theta_2}{2} + \Theta_3\right)} = H \times \frac{1 - \tan(\Theta_1) \times \frac{2y - Y}{Y} \times \tan\left(\frac{\Theta_2}{2}\right)}{\tan(\Theta_1) + \frac{2y - Y}{Y} \times \tan\left(\frac{\Theta_2}{2}\right)}$$

If the Dy is calculated using the above Equation 6, the distance Dx in the horizontal direction in which the object is spaced with respect to the camera may be calculated using the calculated distance Dy.

Figure 5:
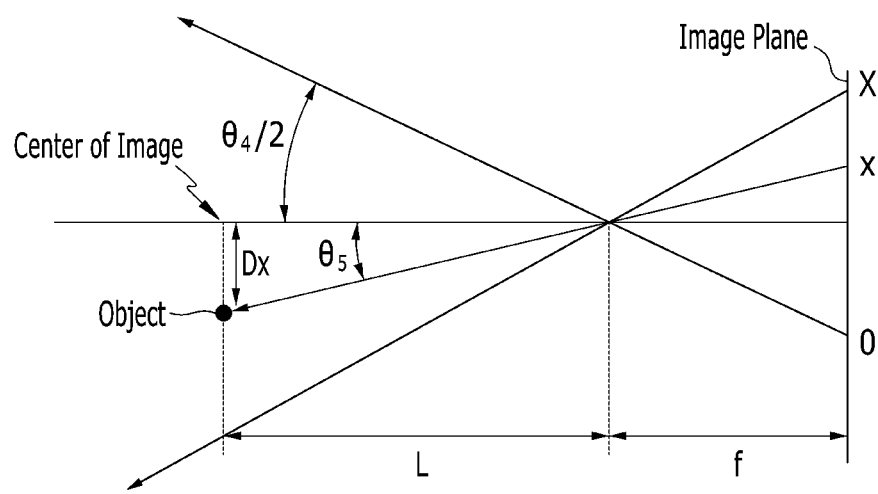
FIG. 5 is a top view of the state of FIG. 4.

FIG. 5 is a top view of the state of FIG. 4. In FIG. 5, $\Theta_4$ is a horizontal angle of view of the camera and is a value preset by the camera. Further, $\Theta_5$ is a horizontal angle of object foot-print for the foot-print of the object and the coordinate converter 140 may calculate the $\Theta_5$ using the foot-print coordinate. Further, L represents a diagonal distance L from the camera and is defined as $$L = \sqrt{Dy^2 + H^2}$$

The relationship between the distance Dx in the horizontal direction of the object and the $\Theta_5$ is as the following Equation 7.

$$Dx = \tan(\Theta_5) sL \quad \text{(Equation 7)}$$

Here, the relationship between the $\Theta_4$ and $\Theta_5$ and the focal length f is as the following Equation 8, and therefore the distance Dx in the horizontal direction of the object is finally calculated as the following Equation 9.

$$\tan(\Theta_5) = \frac{x - \frac{X}{2}}{f}, \quad \text{(Equation 8)}$$

$$f = \frac{\frac{X}{2}}{\tan\left(\frac{\Theta_4}{2}\right)}$$

$$D_x = \frac{x - \frac{X}{2}}{\tan\left(\frac{\Theta_4}{2}\right)} SL = \frac{2x - X}{X} S \tan\left(\frac{\Theta_4}{2}\right) SL \quad \text{(Equation 9)}$$

As described above, the foot-print real coordinates Dx and Dy are finally calculated as the above Equations 6 and 9.

For the coordinate converter 140 to calculate the foot-print real coordinates Dx and Dy, the information on the angle $\Theta_1$ of the tilted camera and the height H of the camera is required. Industrial sites such as factories handling dangerous objects and business places are usually large in scale, and therefore hundreds of cameras need to be installed for surveillance. As a result, it is difficult to ensure and input the installation information of the cameras. Therefore, according to the exemplary embodiment of the present invention, the tilt angle $\Theta_1$ of the camera is automatically calculated by the camera installation angle calculator 150 and the height H of the camera is set to be an arbitrary value by the user.

The camera installation angle calculator 150 calculates the tilt angle $\Theta_1$ of the camera. This will be described with reference to FIGS. 6 and 7.

Figure 6:
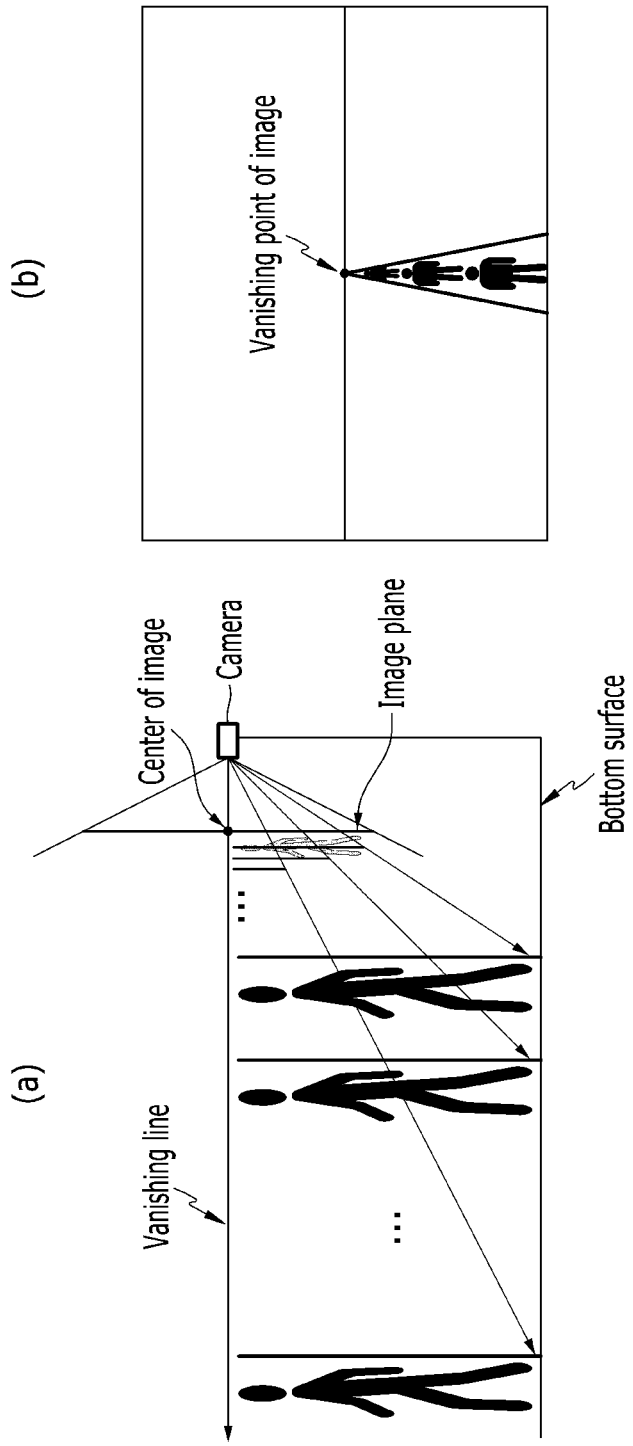
FIG. 6 is a diagram illustrating a case in which the camera is installed in parallel with a bottom surface.

FIG. 6 is a diagram illustrating a case in which the camera is installed in parallel with a bottom surface. More specifically, (a) of FIG. 6 is a diagram illustrating the installation condition of the camera and (b) of FIG. 6 is a diagram illustrating the image photographed by the camera.

In the installation condition of (a) of FIG. 6, when the object is increasingly far away from the camera, as illustrated in (b) of FIG. 6, a vanishing point of the image becomes a center of the image of the camera. At this point, a parallel line of the bottom surface meets the vanishing point of the image.

Figure 7:
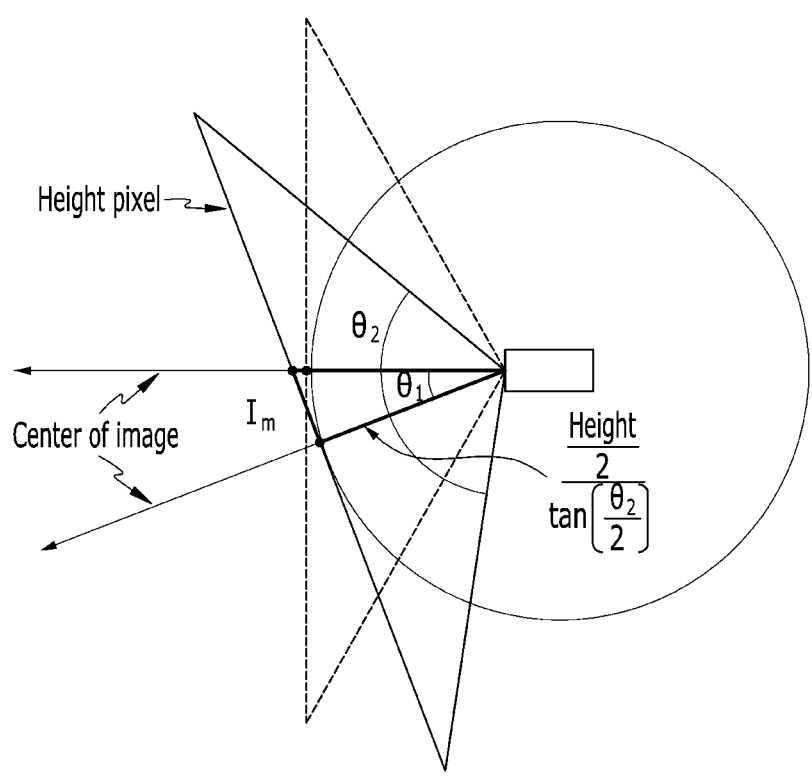
FIG. 7 is a diagram illustrating a side when the camera is installed at a predetermined angle $\Theta_1$ with respect to the bottom surface.

FIG. 7 is a diagram illustrating a side when the camera is installed at a predetermined angle $\Theta_1$ with respect to the bottom surface.

When the parallel line of the bottom surface is given in the image, the installation angle $\Theta_1$ of the camera is calculated as the following Equation 10.

$$\tan(\Theta_1) = I_m S \frac{\tan\left(\frac{\Theta_2}{2}\right)}{\frac{\text{Height}}{2}} \quad \text{(Equation 10)}$$

In the above Equation 10, Im represents the number of Y-axis coordinate pixels spaced apart from the center of the camera and is calculated using the two parallel lines of the bottom surface. Further, the $\Theta_2$ represents the vertical angle of view of the camera and the height represents the number of vertical pixels (height pixel in FIG. 9) of the image.

As described above, the camera installation angle calculator 150 according to the exemplary embodiment of the present invention automatically calculates the installation angle $\Theta_1$ of the camera as the following Equation 10 and outputs the calculated value to the coordinate converter 140.

Meanwhile, the installation height H of the camera according to the exemplary embodiment of the present invention is a value arbitrarily set by the user. Therefore, the coordinate converter 140 according to the exemplary embodiment of the present invention calculates the foot-print real coordinates on the basis of the arbitrarily set installation height H of the camera. That is, as the arbitrarily set installation height H of the camera is larger or smaller than the actual height, the foot-print real coordinates Dx and Dy output from the coordinate converter 140 are also changed.

The height extractor 160 uses the foot-print image coordinate, a head coordinate, and the arbitrarily set installation height H of the camera to calculate the height of the object.

Figure 8:
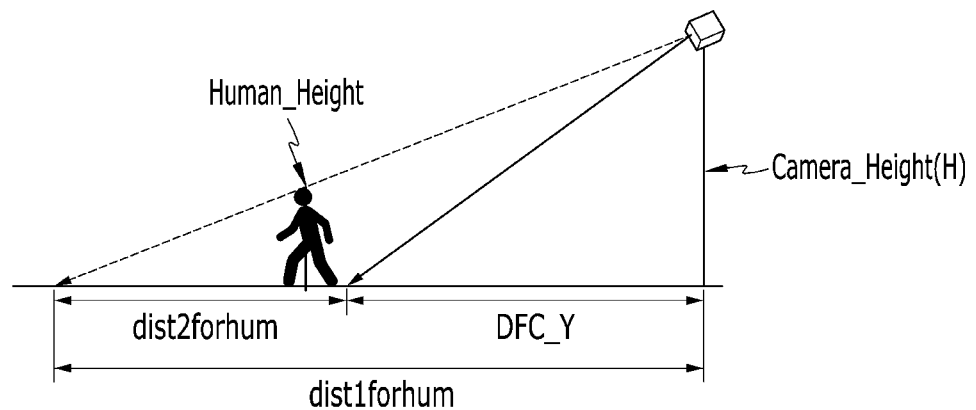
FIG. 8 is a diagram illustrating a relationship between a height Human_Height of an object and a height H of the camera.

FIG. 8 is a diagram illustrating a relationship between a height Human_Height of an object and a height H of the camera.

Referring to FIG. 8, the height extractor 160 may use the head coordinate to calculate dist1forHum and calculate DFC_Y using the foot-print image coordinate. Here, dist2forHum is a value obtained by subtracting the DFC_Y from the dist1forHum.

Therefore, the relationship between the height Human_Height of the object and the height H of the camera is as the following Equation 11.

$$\text{dist2forHum}:\text{dist1forHum} = \quad \text{(Equation 11)}$$

$$\text{HumanHeight}:\text{CameraHeight}$$

$$\text{HumanHeight} = \text{CameraHeightS} \frac{\text{dist2forHum}}{\text{dist1forHum}}$$

As illustrated in the above Equation 11, the height Human_Height of the object also depends on the height H (Camera_Height) of the camera like the foot-print real coordinates.

Next, the running condition determinator 170 according to the exemplary embodiment of the present invention finally determines the running condition using the foot-print real coordinates Dx and Dy and the height Human_Height of the object. Here, both the foot-print real coordinates and the height of the camera are values changed depending on the height H of the camera.

The moving distance of the object for any time t and t-n is calculated as the following Equation 12. That is, the running condition determinator 170 may calculate the moving distance of the object using the foot-print real coordinates Dx and Dy.

$$\text{dist} = \sqrt{(Dx_t - Dx_{t-n})^2 + (Dy_t - Dy_{t-n})^2} \quad \text{(Equation 12)}$$

Here, the running condition determinator 170 according to the exemplary embodiment of the present invention finally determines that the object runs when the moving distance of the object calculated as the above Equation 12 is larger than the height Human_Height of the object calculated as the above Equation 11. Even the moving distance of the object calculated in the above Equation 12 is a value relying on the height H of the camera and even the height H of the camera is in proportion to the height Human_Height of the object. Therefore, even if the accurate distance that the object actually moves may not be known, when the calculated height Human_Height of the object is set to be the threshold value, the running condition of the object may be determined.

Figure 9:
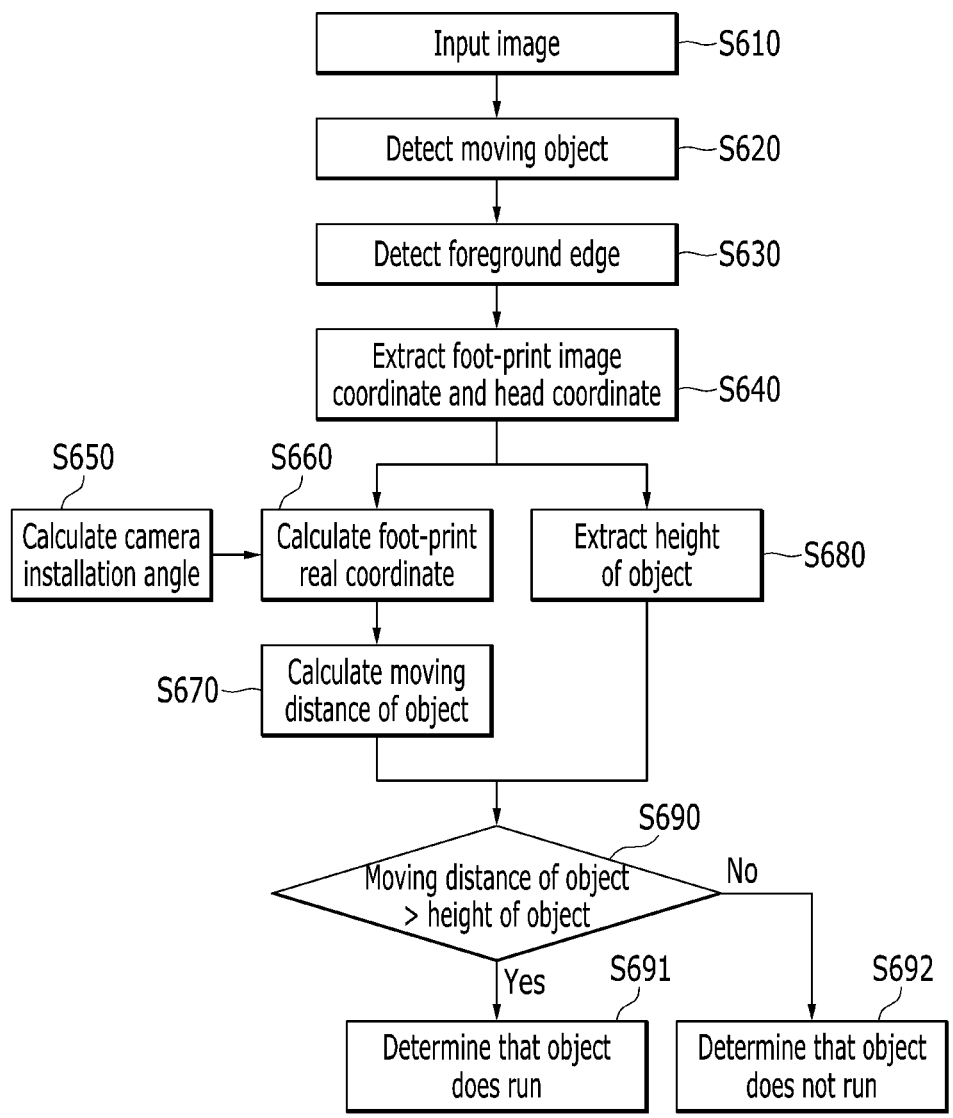
FIG. 9 is a flow chart illustrating a method for detecting running according to the exemplary embodiment of the present invention.

FIG. 9 is a flow chart illustrating a method for detecting running according to the exemplary embodiment of the present invention.

As illustrated in FIG. 9, the image photographed by the camera is input to the object detector 110 (S610). The object detector 110 detects the moving object by applying the tracking algorithm to the input image (S620).

The foreground edge detector 120 detects the foreground edge for the object detected by the object detector 110 (S630). That is, the foreground edge detector 120 extracts the common component of the image edge and the time edge and defines the edge satisfying the common component as the foreground edge.

Meanwhile, the foot-print and head coordinate extractor 130 uses the square zone of the foreground edge to extract the foot-print image coordinate and extract the coordinate corresponding to the head part of the object (S640).

The camera installation angle calculator 150 calculates the installation angle $\Theta_1$ of the camera (S650). That is, the camera installation angle calculator 150 automatically calculates the installation angle $\Theta_1$ of the camera like the above Equation 10. Meanwhile, the step S650 may be performed once only when the first image is input.

The coordinate converter 140 calculates the foot-print real coordinates using the installation angle of the camera, the height H of the camera set as an arbitrarily value, and the foot-print image coordinate (S660). That is, the coordinate converter 140 calculates the foot-print real coordinates using the above Equations 6 and 9.

Further, the running condition determinator 170 calculates the moving distance of the object using the foot-print real coordinates (S670). That is, the running condition determinator 170 calculates the moving distance of the object using the above Equation 12.

The object height extractor 160 uses the foot-print image coordinate, a head coordinate, and the arbitrarily set installation height H of the camera to calculate the height of the object (S680). That is, the object height extractor 160 calculates the height Human_Height of the object using the above Equation 11.

Meanwhile, the running condition determinator 170 compares the moving distance of the object calculated in the step S670 with the height of the object extracted in the step S680 to determine whether the object runs (S690). The running condition determinator 170 determines that the object runs if the moving distance of the object is larger than the height of the object (S691). Further, the running condition determinator 170 determines that the object does not run if the moving distance of the object is not larger than the height of the object (S692).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The present invention relates to a system for detecting running.

The invention claimed is:

1. A method for detecting running of an object using an image photographed by a camera in a system for detecting running, comprising:
   detecting a moving object in the image;
   detecting a foreground edge of the object;
   extracting a foot-print image coordinate using the foreground edge;
   extracting a head coordinate that is a coordinate for a head part of the object using the foreground edge;
   calculating a tilt angle of the installed camera;
   acquiring a foot-print real coordinate that is a coordinate where the object is spaced apart from the camera using the foot-print image coordinate, the angle, and an installation height of the camera;
   calculating a height of the object; and
   determining whether the object runs using the foot-print real coordinate and the height of the object.

2. The method of claim 1, wherein:
   the installation height of the camera is a value arbitrarily set by a user.

3. The method of claim 2, wherein:
   the foot-print real coordinate and the height of the object rely on the installation height of the camera.

4. The method of claim 1, wherein:
   the calculating of the height of the object includes calculating the height of the object using the installation height of the camera, the foot-print image coordinate, and the head coordinate.

5. The method of claim 1, wherein:
   the calculating of the angle includes calculating the angle using a vertical angle of view of the camera, the number of vertical pixels of the image, and the number of Y-axis coordinate pixels spaced apart from a center of the camera.

6. The method of claim 1, wherein:
   the acquiring of the foot-print real coordinate includes:
   calculating a first coordinate that is a coordinate where the foot-print is spaced apart from the camera in a vertical direction; and
   calculating a second coordinate that is a coordinate where the foot-print is spaced apart from the camera in a horizontal direction using the first coordinate.

7. The method of claim 1, wherein:
   the determining includes:
   calculating a moving distance of the object using the foot-print real coordinates; and
   comparing the moving distance with the height of the object.

8. The method of claim 7, wherein:
   the determining further includes determining that the object runs when the moving distance is larger than the height of the object.

* * * * *